United States Patent
DeStefano et al.

(10) Patent No.: US 9,298,691 B2
(45) Date of Patent: Mar. 29, 2016

(54) METHOD AND APPARATUS FOR RETRIEVING AND COMBINING SUMMARIZED LOG DATA IN A DISTRIBUTED LOG DATA PROCESSING SYSTEM

(75) Inventors: Jason Michael DeStefano, Sunnyvale, CA (US); Tomasz Mariusz Mojsa, Foster City, CA (US); Thomas Hunt Schabo Grabowski, Sunnyvale, CA (US)

(73) Assignee: TIBCO Software Inc., Palo Alto, CA (US)

( * ) Notice: Subject to any disclaimer, the term of this patent is extended or adjusted under 35 U.S.C. 154(b) by 63 days.

(21) Appl. No.: 13/536,720

(22) Filed: Jun. 28, 2012

(65) Prior Publication Data
US 2013/0144894 A1 Jun. 6, 2013

Related U.S. Application Data

(62) Division of application No. 10/898,016, filed on Jul. 23, 2004, now abandoned.

(60) Provisional application No. 60/525,465, filed on Nov. 26, 2003, provisional application No. 60/525,401, filed on Nov. 26, 2003.

(51) Int. Cl.
| | |
|---|---|
| *G06F 17/27* | (2006.01) |
| *H04L 12/24* | (2006.01) |
| *H04L 12/26* | (2006.01) |
| *H04L 29/06* | (2006.01) |

(52) U.S. Cl.
CPC ......... *G06F 17/2705* (2013.01); *H04L 43/062* (2013.01); *H04L 43/0876* (2013.01); *H04L 63/1416* (2013.01); *H04L 41/5074* (2013.01)

(58) Field of Classification Search
CPC ............ G06F 17/2705; H04L 41/5074; H04L 43/062; H04L 43/0876; H04L 63/1416
USPC ......................................................... 707/755
See application file for complete search history.

(56) References Cited

U.S. PATENT DOCUMENTS

| | | |
|---|---|---|
| 5,606,693 A | 2/1997 | Nilsen et al. |
| 5,627,886 A | 5/1997 | Bowman |
| 5,668,986 A | 9/1997 | Nilsen et al. |
| 5,787,253 A | 7/1998 | McCreery et al. |
| 5,832,508 A | 11/1998 | Sherman et al. |

(Continued)

OTHER PUBLICATIONS

Sukran Asarcikli, "Firewall monitoring using intrusion detection system", Oct. 2005.

(Continued)

*Primary Examiner* — Jacob F Bétit
*Assistant Examiner* — Navneet K Gmahl
(74) *Attorney, Agent, or Firm* — Fish & Richardson P.C.

(57) ABSTRACT

A system can receive raw log data from log-producing devices. The system can parse the raw log data to generate parsed log data, including extracting fields from the raw log data, generating structured query language (SQL) statements from the extracted fields, and inserting the SQL statements in a database. The system can summarize the parsed log data, including identifying one or more SQL statements based on fields of commonality and fields of uniqueness, and creating summarized data that include a new statement condensed from the identified SQL statements. The system can then generate a report based on the summarized data.

19 Claims, 9 Drawing Sheets

(56) References Cited

U.S. PATENT DOCUMENTS

| | | | |
|---|---|---|---|
| 5,832,517 A | 11/1998 | Knutsen, II | |
| 5,886,643 A | 3/1999 | Diebboll et al. | |
| 5,903,898 A | 5/1999 | Cohen et al. | |
| 6,052,694 A | 4/2000 | Bromberg | |
| 6,134,591 A | 10/2000 | Nickles | |
| 6,289,455 B1 | 9/2001 | Kocher et al. | |
| 6,321,234 B1 | 11/2001 | Debrunner | |
| 6,381,628 B1 | 4/2002 | Hunt | |
| 6,484,203 B1 | 11/2002 | Porras et al. | |
| 6,496,858 B1 | 12/2002 | Frailong et al. | |
| 6,530,024 B1 | 3/2003 | Proctor | |
| 6,618,822 B1 | 9/2003 | Loaiza et al. | |
| 6,640,305 B2 | 10/2003 | Kocher et al. | |
| 6,714,977 B1 | 3/2004 | Fowler et al. | |
| 6,754,214 B1 | 6/2004 | Mahalingaiah | |
| 6,836,894 B1 | 12/2004 | Hellerstein et al. | |
| 6,873,981 B2 | 3/2005 | Nareddy et al. | |
| 6,917,972 B1 | 7/2005 | Basko et al. | |
| 7,031,981 B1 | 4/2006 | DeLuca et al. | |
| 7,039,816 B2 | 5/2006 | Kocher et al. | |
| 7,043,505 B1 * | 5/2006 | Teague et al. | |
| 7,099,884 B2 | 8/2006 | Gu | |
| 7,103,772 B2 | 9/2006 | Jorgensen et al. | |
| 7,155,460 B2 | 12/2006 | McGovern et al. | |
| 7,181,766 B2 | 2/2007 | Bendinelli et al. | |
| 7,219,239 B1 | 5/2007 | Njemanze et al. | |
| 7,231,403 B1 | 6/2007 | Howitt et al. | |
| 7,246,156 B2 | 7/2007 | Ginter et al. | |
| 7,599,939 B2 | 10/2009 | DeStefano et al. | |
| 8,234,256 B2 | 7/2012 | DeStefano et al. | |
| 2002/0046273 A1 * | 4/2002 | Lahr et al. | 709/224 |
| 2002/0062237 A1 | 5/2002 | Matsumoto et al. | |
| 2002/0138762 A1 | 9/2002 | Horne | |
| 2003/0037136 A1 | 2/2003 | Labovitz et al. | |
| 2003/0120593 A1 * | 6/2003 | Bansal et al. | 705/39 |
| 2003/0200204 A1 | 10/2003 | Limoges et al. | |
| 2005/0114321 A1 | 5/2005 | DeStefano et al. | |
| 2005/0114505 A1 | 5/2005 | DeStefano et al. | |
| 2005/0114706 A1 | 5/2005 | DeStefano et al. | |
| 2005/0114707 A1 | 5/2005 | DeStefano et al. | |
| 2005/0125807 A1 | 6/2005 | Brady, Jr. et al. | |
| 2006/0265746 A1 | 11/2006 | Farley et al. | |
| 2007/0011308 A1 | 1/2007 | Brady, Jr. et al. | |
| 2007/0011309 A1 | 1/2007 | Brady et al. | |
| 2011/0125725 A1 | 5/2011 | Daughtrey et al. | |
| 2013/0138667 A1 | 5/2013 | DeStefano et al. | |

OTHER PUBLICATIONS

USPTO BPAI decision dated Aug. 20, 2010 for related U.S. Appl. No. 10/897,568, 7 pages.

Yang, et al. "A scalable, Web-based architecture for hierarchical network management", Global Telecommunications Conference, Globecom '99, 1999, pp. 1882-1888.

* cited by examiner

METHOD AND APPARATUS FOR RETRIEVING AND COMBINING SUMMARIZED LOG DATA IN A DISTRIBUTED LOG DATA PROCESSING SYSTEM

CROSS-REFERENCES TO RELATED APPLICATIONS

This application is a divisional of U.S. patent application Ser. No. 10/898,016, filed Jul. 23, 2004, entitled "Method and apparatus for retrieving and combining summarized log data in a distributed log data processing system", which claims priority benefit of U.S. Provisional Patent Application No. 60/525,401, filed Nov. 26, 2003, entitled "System and Method for Summarizing Log Data" and also claims benefit of U.S. Provisional Patent Application No. 60/525,465, filed Nov. 26, 2003, entitled "System and Method for Parsing Log Data", all of which are incorporated by reference herein their entireties.

BACKGROUND OF THE INVENTION

1. Field of the Invention

This invention relates to computer network monitoring. More particularly, it relates to handling the log data generated by such log-producing devices and processes as network firewalls, routers, file servers, VPN servers, operating systems, software applications and the like.

2. Description of the Related Art

Computer networks in general, and private networks such as Local Area Networks (LANs) and intranets in particular, require security devices and processes to protect them from unauthorized access and/or manipulation. A computer firewall is one such device. At the simplest level, it may comprise hardware and/or software that filters the information coming through a network connection (most commonly an Internet connection) into a private network or computer system. If an incoming packet of information is flagged by the filters, it is not allowed to pass through the firewall.

A firewall can implement security rules. For example, a network owner/operator might allow only one, certain computer on a LAN to receive public File Transfer Protocol (FTP) traffic: The FTP protocol is used to download and upload files. Accordingly, the firewall would allow FTP connections only to that one computer and prevent them on all others. The administrator of a private network can set up rules such as this for FTP servers, Web servers, Telnet servers, and the like.

Typically, firewalls use one or more of the following methods to restrict the information coming in and out of a private network:

packet filtering—data packets that meet the criteria set of the filter are allowed to proceed to the requesting system while those that do not are blocked from further transmission.

proxy service—information from an external network (such as the Internet) is retrieved by the firewall and subsequently sent to the requesting system. The effect of this action is that the remote computer on the external network does not establish direct communication with a computer on the private network other than the proxy server.

stateful inspection—a comparison of certain key parts of data packets to a database of trusted information. Data going from the private network to the public network is monitored for specific defining characteristics and incoming information is compared to those characteristics. If the comparison is a match within defined parameters, the data is allowed to pass through the firewall.

A company might also use a firewall to block all access to certain IP addresses or allow access only to specific domain names. Protocols define how a client and server will exchange information. Common protocols include: Internet Protocol (IP), the main protocol of the Internet; Transport Control Protocol (TCP), used to disassemble and assemble information that travels over the Internet; Hypertext Transfer Protocol (HTTP), used for Web pages; File Transfer Protocol (FTP), used to download and upload computer files; User Datagram Protocol (UDP), used for information that does not require a response such as streaming audio and video; Internet Control Message Protocol (ICMP), used by a router to exchange information with another router; Simple Mail Transport Protocol (SMTP), used to send text e-mail; Simple Network Management Protocol (SNMP), used to obtain system information from a remote computer; and, Telnet, which is used to execute commands on a remote computer.

A company might use a firewall or a router to enable one or two computers on its private network to handle a specific protocol and prohibit activity using that protocol on all of its other networked computers.

Similarly, a firewall may be used to block access to certain ports and/or permit port [#] access only on a certain computer.

Firewalls can also be set to "sniff" each data packet for certain words or phrases. For example, a firewall could be set to exclude any packet containing the word "nude." Alternatively, a firewall may be set up such that only certain types of information, such as e-mail, are allowed to pass through.

Many IT devices and processes produce a log of their activities (hereinafter "raw log data"). One particular type of raw log data is known as "syslog data." Log data from VPN servers, firewalls and routers commonly comprises date and time information along with the IP addresses of the source and destination of data packets and a text string indicating the action taken by the data log-producing device—e.g., "accept" or "deny" or "TCP connection dropped." An example of a raw log data from a Virtual Private Network (VPN) server is reproduced in Table I. Log data from other sources comprises information relevant to the providing source. An example of raw log data from an e-mail server ("sendmail" log data) is reproduced in Table II.

It will be appreciated that periods of high network activity generate large quantities of log data. During an attempted security breach, it may be necessary for network administrators to access the log data to determine the nature of the attack and/or adjust the security parameters in order to better defend against the attack. Although systems may provide a means for viewing the log data in real time or near real time, the sheer quantity of data generated makes it largely impractical to manually glean useful information from raw log data. Accordingly, systems and methods have been developed for parsing and summarizing log data in databases upon which queries may be run in near real time to retrieve relevant information.

A system and method for parsing log data is disclosed in commonly-owned U.S. provisional patent application Ser. No. 60/525,465 filed Nov. 26, 2003, and a system and method for summarizing log data is disclosed in commonly-owned U.S. provisional patent application Ser. No. 60/525,401 filed Nov. 26, 2003, both of which are hereby incorporated by reference.

Although parsed and summarized data is often more useful and convenient for monitoring network performance, real-time network troubleshooting and the optimization of security parameters, regulatory compliance and/or company policy may necessitate the storage of raw log data. Inasmuch as the above-described systems stored parsed log data and only later forwarded the raw log data, the reliability of the full raw log data streams was reduced. Furthermore, delay issues complicated the raw log data storage and the growing volume of log data created logistical problems. The present invention solves these problems.

SUMMARY OF THE INVENTION

Raw log data is, in one exemplary embodiment, received by a raw log server, stored in complete form in a database and sent to a networked log data analyzer for parsing, summarizing and routine reporting. The raw log data may be received using a first protocol from the log-producing network devices on the same local area network as the raw log server and from a log data analyzer at a remote location on a different network using a second protocol over a wide area network. The remote log data analyzer may encrypt and/or compress the raw log data prior to periodically sending it over a WAN to the raw log server. Database management may include processes which archive and/or purge the stored raw log data after a predefined time interval, in response to a predetermined event(s) and/or in response to data storage capacity constraints. Further database management handles the process of integrating the local raw log data in the first protocol and the remote raw log data in the second protocol. Queries and reports may be run on the database maintained by the raw log server to retrieve the raw log data. Queries and reports may also be run from a central management station to retrieve and merge reports form the various network log data analyzers.

BRIEF DESCRIPTION OF THE DRAWING FIGURES

DETAILED DESCRIPTION

Figure 1:
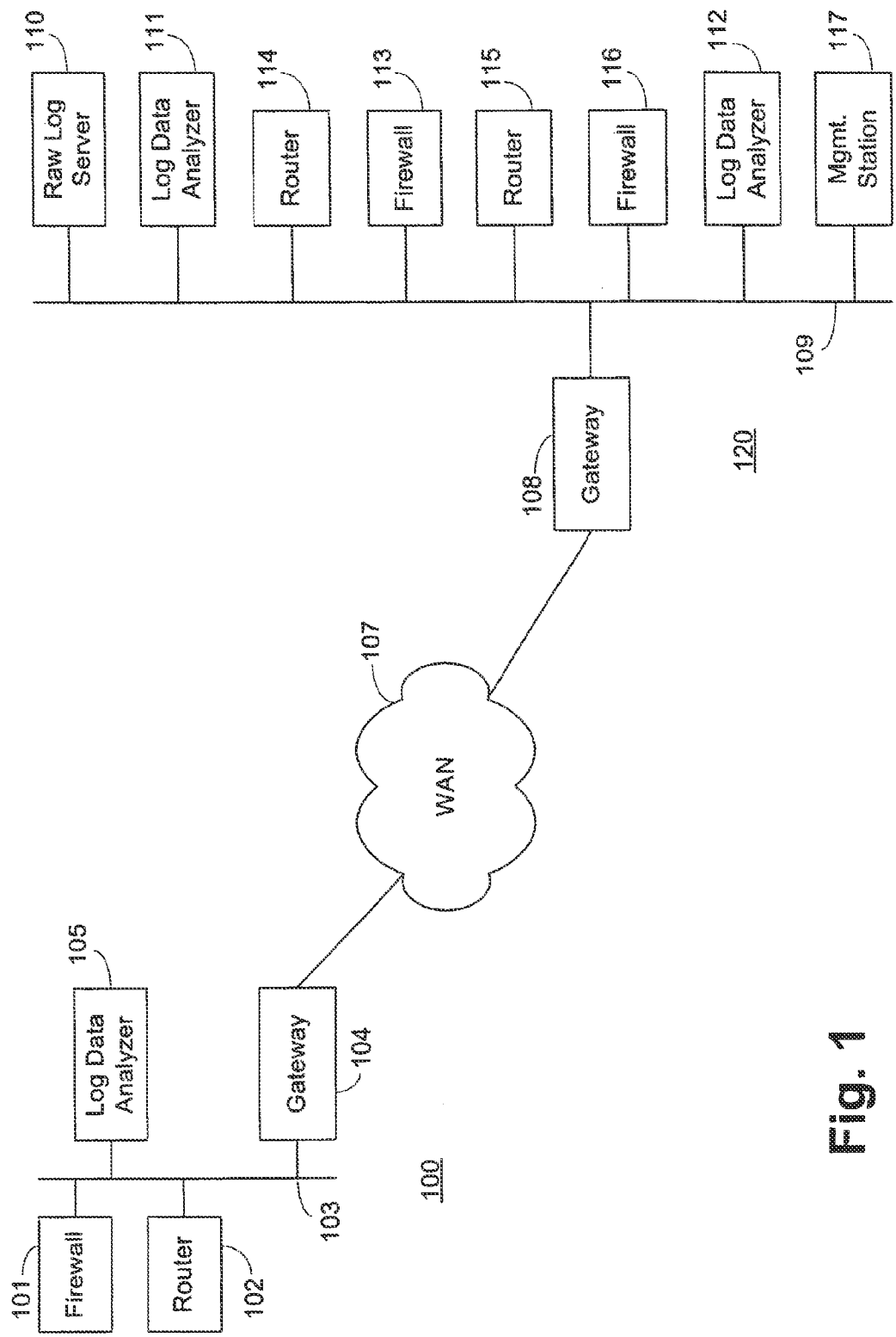
FIG. 1 is a schematic representation of a local network comprising a raw log server and a plurality of log data analyzers and a remote network linked to the local network by a WAN.

Log data is commonly comprised of a text string. An example of log data from a VPN server is shown in Table I and an example of log data from an e-mail server is shown in Table II.

TABLE I

<2>Mar 25 00:17:38 10.0.0.98 <134> 3181 03/25/2004 00:17:54 tEvtLgMgr 0 :
Address Pool [11] Dhcp: Unicasting DHCPREQUEST xid eeee36bf to 10.0.0.1
<2>Mar 25 00:17:39 10.0.0.98 <134> 3181 03/25/2004 00:17:54 tEvtLgMgr 0 :
Address Pool [11] Dhcp: address bound to 10.0.0.184-255.255.255.0 -- renewal in 21600 seconds.
<2>Mar 25 00:17:39 10.0.0.98 <134> 3181 03/25/2004 00:18:02 tEvtLgMgr 0 :
Address Pool [11] Dhcp: Unicasting DHCPREQUEST xid eeee684c to 10.0.0.1
<2>Mar 25 00:17:39 10.0.0.98 <134> 3181 03/25/2004 00:18:02 tEvtLgMgr 0 :
Address Pool [11] Dhcp: address bound to 10.0.0.185-255.255.255.0 -- renewal in 21600 seconds.
<2>Mar 25 00:17:55 10.0.0.98 <134> 3181 03/25/2004 00:18:10 tEvtLgMgr 0 :
Address Pool [11] Dhcp: Unicasting DHCPREQUEST xid eeee1705 to 10.0.0.1
<2>Mar 25 00:17:56 10.0.0.98 <134> 3181 03/25/2004 00:18:10 tEvtLgMgr 0 :
Address Pool [11] Dhcp: address bound to 10.0.0.183-255.255.255.0 -- renewal in 21600 seconds.
<2>Mar 25 01:09:02 10.0.0.98 <134> 3181 03/25/2004 01:09:21 tEvtLgMgr 0 :
Address Pool [11] Dhcp: Unicasting DHCPREQUEST xid eeee2683 to 10.0.0.1
<2>Mar 25 01:09:03 10.0.0.98 <134> 3181 03/25/2004 01:09:21 tEvtLgMgr 0 :
Address Pool [11] Dhcp: address bound to 10.0.0.102-255.255.255.0 -- renewal in 21600 seconds.
<2>Mar 25 02:44:53 10.0.0.98 <134> 3181 03/25/2004 02:45:12 tEvtLgMgr 0 :
Address Pool [11] Dhcp: Unicasting DHCPREQUEST xid eeee19fa to 10.0.0.1
<2>Mar 25 02:44:53 10.0.0.98 <134> 3181 03/25/2004 02:45:13 tEvtLgMgr 0 :
Address Pool [11] Dhcp: address bound to 10.0.0.199-255.255.255.0 -- renewal in 21600 seconds.
<2>Mar 25 06:17:41 10.0.0.98 <134> 3181 03/25/2004 06:17:54 tEvtLgMgr 0 :
Address Pool [11] Dhcp: Unicasting DHCPREQUEST xid eeee36bf to 10.0.0.1
<2>Mar 25 06:17:41 10.0.0.98 <134> 3181 03/25/2004 06:17:54 tEvtLgMgr 0 :
Address Pool [11] Dhcp: address bound to 10.0.0.184-255.255.255.0 -- renewal in 21600 seconds.
<2>Mar 25 06:17:41 10.0.0.98 <134> 3181 03/25/2004 06:18:02 tEvtLgMgr 0 :
Address Pool [11] Dhcp: Unicasting DHCPREQUEST xid eeee684c to 10.0.0.1
<2>Mar 25 06:17:41 10.0.0.98 <134> 3181 03/25/2004 06:18:02 tEvtLgMgr 0 :
Address Pool [11] Dhcp: address bound to 10.0.0.185-255.255.255.0 -- renewal in 21600 seconds.
<2>Mar 25 06:17:57 10.0.0.98 <134> 3181 03/25/2004 06:18:10 tEvtLgMgr 0 :
Address Pool [11] Dhcp: Unicasting DHCPREQUEST xid eeee1705 to 10.0.0.1
<2>Mar 25 06:17:57 10.0.0.98 <134> 3181 03/25/2004 06:18:10 tEvtLgMgr 0 :
Address Pool [11] Dhcp: address bound to 10.0.0.183-255.255.255.0 -- renewal in 21600 seconds.
<2>Mar 25 07:09:04 10.0.0.98 <134> 3181 03/25/2004 07:09:21 tEvtLgMgr 0 :
Address Pool [11] Dhcp: Unicasting DHCPREQUEST xid eeee2683 to 10.0.0.1
<2>Mar 25 07:09:04 10.0.0.98 <134> 3181 03/25/2004 07:09:21 tEvtLgMgr 0 :
Address Pool [11] Dhcp: address bound to 10.0.0.102-255.255.255.0 -- renewal in 21600 seconds.
<2>Mar 25 08:44:54 10.0.0.98 <134> 3181 03/25/2004 08:45:13 tEvtLgMgr 0 :
Address Pool [11] Dhcp: Unicasting DHCPREQUEST xid eeee19fa to 10.0.0.1
<2>Mar 25 08:44:55 10.0.0.98 <134> 3181 03/25/2004 08:45:13 tEvtLgMgr 0 :
Address Pool [11] Dhcp: address bound to 10.0.0.199-255.255.255.0 -- renewal in 21600 seconds.

TABLE II

May 2 04:03:43 en1 sendmail[3893]: i4293bg03869:
to=<sias@bookpeddlers.com>,<sweeper@bookpeddlers.com>, delay=00:00:06,
xdelay=00:00:03, mailer=virthostmail, pri=74907, relay=bookpeddlers.com,
dsn=2.0.0, stat=Sent (i4293eb03897 Message accepted for delivery)
May 2 04:03:43 en1 sendmail[876]: i4201rO04491: to=<vkyvkofb@amnaes3.com>,
delay=09:01:50, xdelay=00:00:00, mailer=esmtp, pri=120880,
relay=218.106.116.147. [218.106.116.147], dsn=4.0.0, stat=Deferred:
Connection refused by 218.106.116.147.
May 2 04:03:44 en1 sendmail[3914]: i4293eb03897: to=vickilee@aol.com,
delay=00:00:03, xdelay=00:00:00, mailer=esmtp, pri=44213, relay=mailin-
03.mx.aol.com. [64.12.138.120], dsn=2.0.0, stat=Sent (OK)
May 2 04:03:49 en1 sendmail[876]: i421IDo08289: to=<715tuoddme@ewmd41.com>,
delay=07:45:35, xdelay=00:00:00, mailer=esmtp, pri=120882,
relay=218.106.116.147., dsn=4.0.0, stat=Deferred: Connection refused by
218.106.116.147.
May 2 04:03:51 en1 sendmail[876]: i425I2h22324: to=<jlx7ivh@aswphamre.com>,
delay=03:45:49, xdelay=00:00:00, mailer=esmtp, pri=120882,
relay=218.106.116.147., dsn=4.0.0, stat=Deferred: Connection refused by
218.106.116.147.
May 2 04:03:52 en1 sendmail[876]: i424UG719748: to=<kq395gy@mnftphamrd.com>,
delay=04:33:36, xdelay=00:00:00, mailer=esmtp, pri=120885,
relay=218.106.116.147., dsn=4.0.0, stat=Deferred: Connection refused by
218.106.116.147.
May 2 04:03:52 en1 sendmail[876]: i421Qhb08867: to=<ysijamz@cnfdb3.com>,
delay=07:37:09, xdelay=00:00:00, mailer=esmtp, pri=120886,
relay=218.106.116.147., dsn=4.0.0, stat=Deferred: Connection refused by
218.106.116.147.
May 2 04:03:53 en1 sendmail[876]: i421Zhu09425: to=vickilee@aol.com,
delay=07:28:10, xdelay=00:00:00, mailer=esmtp, pri=120886, relay=mailin-
01.mx.aol.com., dsn=4.0.0, stat=Deferred: Connection reset by mailin-
01.mx.aol.com.
May 2 04:03:53 en1 sendmail[876]: i421Zhu09425: i4290jb00876: sender notify:
Warning: could not send message for past 4 hours
May 2 04:03:53 en1 sendmail[30594]: i3TAde725551: to=<crmvmrbmpjx@Xoom.de>,
delay=2+22:24:13, xdelay=00:01:00, mailer=esmtp, pri=4817444, relay=xoom.de.
[206.132.179.24], dsn=4.0.0, stat=Deferred: Connection timed out with
xoom.de.
May 2 04:03:53 en1 sendmail[30594]: i3TAER722740: to=<dc529a@mreds4.com>,
delay=2+22:49:26, xdelay=00:00:00, mailer=esmtp, pri=4895345,
relay=218.106.116.147., dsn=4.0.0, stat=Deferred: Connection refused by
218.106.116.147.
May 2 04:03:54 en1 sendmail[876]: i4290jb00876: to=<yynkrfc@mpoweredpc.net>,
delay=00:00:01, xdelay=00:00:00, mailer=esmtp, pri=30986,
relay=smtp17.bellnexxia.net. [206.47.199.31], dsn=5.1.1, stat=User unknown
May 2 04:03:55 en1 sendmail[876]: i4290jb00876: i4290jc00876: return to
sender: User unknown
May 2 04:03:56 en1 sendmail[30594]: i3T7m0604310: to=<t_richter_au@tvr.ro>,
delay=3+01:15:56, xdelay=00:00:02, mailer=esmtp, pri=4981040,
relay=jera.tvr.ro. [212.54.100.7], dsn=4.2.0, stat=Deferred: 450
<t_richter_au@tvr.ro>: User unknown in local recipient table
May 2 04:03:56 en1 sendmail[876]: i4290jc00876: to=vickilee@aol.com,
delay=00:00:01, xdelay=00:00:00, mailer=esmtp, pri=31086, relay=mailin-
04.mx.aol.com., dsn=4.0.0, stat=Deferred: Connection reset by mailin-
04.mx.aol.com.
May 2 04:03:57 en1 sendmail[876]: i427SKB29427: to=vickilee@aol.com,
delay=01:35:37, xdelay=00:00:00, mailer=esmtp, pri=120886, relay=mailin-
04.mx.aol.com., dsn=4.0.0, stat=Deferred: Connection reset by mailin-
04.mx.aol.com.
May 2 04:03:57 en1 sendmail[30594]: i3T96f614079:
to=<kapbfgeidlrkfw@monnsid.com>, delay=2+23:57:16, xdelay=00:00:00,
mailer=esmtp, pri=4982464, relay=218.106.116.147., dsn=4.0.0, stat=Deferred:
Connection refused by 218.106.116.147.
May 2 04:03:57 en1 sendmail[876]: i423nw118194: to=<t45nxi@phanexe.com>,
delay=05:13:59, xdelay=00:00:00, mailer=esmtp, pri=120888,
relay=218.106.116.147., dsn=4.0.0, stat=Deferred: Connection refused by
218.106.116.147.
May 2 04:03:58 en1 sendmail[30594]: i3T8Oq708114:
to=<wapw0j@ernephamre.com>, delay=3+00:39:06, xdelay=00:00:00, mailer=esmtp,
pri=4985257, relay=218.106.116.147., dsn=4.0.0, stat=Deferred: Connection
refused by 218.106.116.147.
May 2 04:03:59 en1 sendmail[30594]: i3T8CR706211: to=<fq402cyf@mreds4.com>,
delay=3+00:51:32, xdelay=00:00:00, mailer=esmtp, pri=4985291,
relay=218.106.116.147., dsn=4.0.0, stat=Deferred: Connection refused by
218.106.116.147.

Log-producing devices such as routers and firewalls may be in networked data communication with one or more raw log servers. The log-producing devices may send the raw log data to the raw log server upon creation or may buffer the raw log data for burst transmission.

Upon receipt of the raw log data, the raw log server may insert the text string comprising the raw log data into a database together with identifying and/or indexing information. Alternatively, a process using a flat file arrangement may be used. For example, the text string may be stored together with the identity of the log-producing device and a date and time stamp. The identity of the log-producing device may be its IP address or any other unique identifier. The time stamp may be the local raw log server's network time, Coordinated Universal Time (UTC), or a combination of local time and the time zone of the log-producing device. The text string comprising the raw log data may be encoded in any suitable text encoding scheme such as the American Standard Code for Information Interchange (ASCII). The database may be any database or file capable of storing and retrieving data in the format sent by the log-producing devices. One example of a database is MySQL. One example of a file is a flat file. The data may be indexed and/or otherwise identified, but it is stored in the database either in the form received or in a form which has a one-to-one correlation with the form in which it was received so as to ensure the integrity of the data—i.e., the raw log data is stored, but not manipulated in any manner which could create any ambiguity in its content.

If the log data was received directly from a local log-producing device (e.g., a firewall or router on the same LAN as the raw log server), the raw log server may also forward the raw log data to a particular log data analyzer on the LAN. The raw log server may include a table which correlates log-producing devices with one or more particular log data analyzers. By consulting the table, the raw log server may forward the raw log data to the appropriate log data analyzer(s). The data may include the identity of the log-producing device, the identity of the raw log server, a time stamp, and/or any other information needed for proper routing and processing.

Raw log data from a log-producing device and raw log data being forwarded by the raw log server to log data analyzer may be sent using a first data transmission protocol. In one preferred embodiment, this first protocol is UDP, a protocol which requires relatively little network overhead. However, the UDP protocol is relatively weak from security and reliability standpoints and thus may be suitable in this context only for use on a local network.

FIG. 1 is a schematic representation of a system according to one embodiment of the invention. A LAN 109 at a location 120 provides data communication between and among raw log server 110, one or more log data analyzers 111, 112, and log-producing devices such as firewalls 113 & 116 and routers 114 & 115. Security management functions may be controlled from a management station 117 which, in some embodiments may be a personal computer or workstation. LAN 109 may be in data communication with a WAN 107 via gateway 108.

As illustrated in FIG. 1, the present invention may also be used to collect and store log data generated by log-producing devices 101, 102 at a remote location 100—i.e., a location not directly connected to the private network or local area network (LAN) 109. In such a situation, it is desirable to collect the raw log data using a log data analyzer 105 on the remote network and periodically forward the raw log data to the raw log server over a wide area network (WAN) 107 or the Internet. Remote LAN 103 may be in data communication with WAN 107 via gateway 104. Since the log-producing devices 101 & 102 are usually not equipped with means for encrypting and/or compressing data prior to transmission, it has been found to be advantageous to provide for those functions in a log data analyzer 105 to which the log-producing devices may directly communicate over remote LAN 103.

Thus, as illustrated in FIG. 1, log-producing devices such as firewall 101 and router 102 at a remote location 100 are in data communication (via a LAN 103) with a dedicated log data analyzer 105. The log data analyzer 105 may collect raw log data from the log-producing devices, encrypt and compress the raw log data and then periodically send it to the raw log server over the WAN 107 using a second protocol. For example, raw log data may be collected in one-minute intervals and sent using a burst mode of data transmission over the WAN in order to conserve network resources—burst mode generally being more efficient than piecemeal transmissions. In one preferred embodiment, the TCP protocol is used because it provides a more robust environment for data transmission than UDP and thus provides greater confidence in the integrity of the log data stored by the raw log server. The local log data analyzer 105 may collect a predetermined quantity of log data before sending it to the raw log server 110 or, alternatively, may send raw log data periodically—e.g., one minute's worth of raw log data may be collected by the local log data analyzer 105 and then sent to the raw log server 110 after encryption and compression. It is not necessary to the practice of the invention that the raw log data be encrypted or compressed prior to transmission.

Raw log data received by a raw log server 110 from a remote log data analyzer may be processed differently than the raw log data obtained from the local log-producing devices 113, 114, 115, 116. For one reason, this is because this raw log data need not be forwarded to a log data analyzer (such as 111 or 112), unless a redundancy in this function is, in which case the raw log data may be forwarded to one or more log data analyzers. The remote log data analyzer 105 already has the raw log data and may proceed to parse, store and summarize the raw log data from its associated log-producing devices 101, 102. Another reason is that it may be desirable to have the raw log data stored chronologically in the raw log database and the transmission of the raw log data over the WAN 107 is delayed. The delay may be due to the fact that the remote raw log data is collected into one-minute intervals prior to transmission to the raw log server and/or delays in transmission over the WAN 107.

Figure 2A:
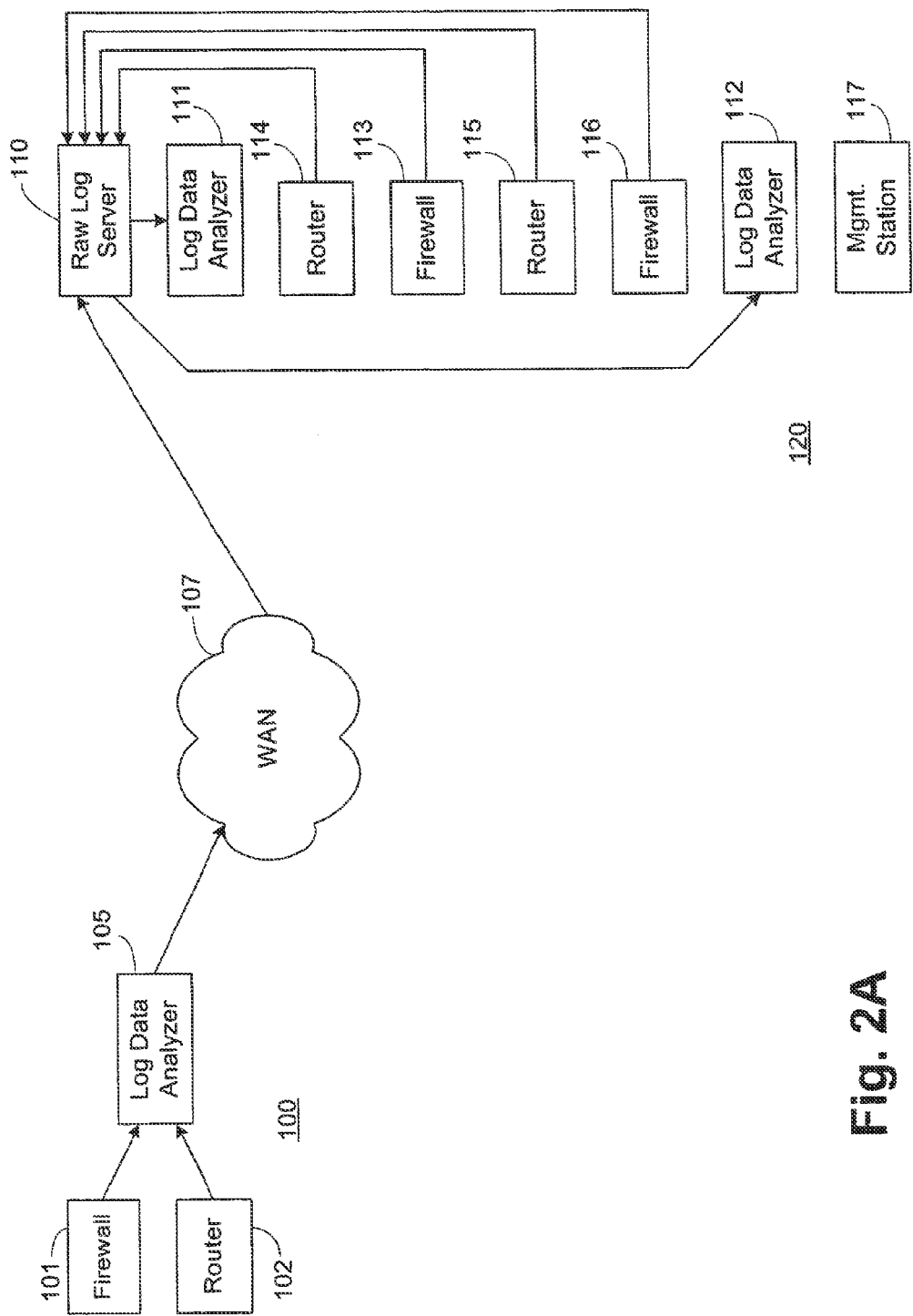
FIG. 2A is a schematic diagram depicting the flow of raw log data according to one embodiment of the invention.

The flow of raw log data according to one illustrative embodiment is shown schematically in FIG. 2A. Raw log data generated at remote location 100 by log-producing devices 101 & 102 is sent to remote log data analyzer 105 which forwards the raw log data for transmission over WAN 107 to raw log server 110 at physical location 120 remote from location 100. Log-producing devices 113-116 at location 120 send raw log data to raw log server 110 which stores the raw log data in physical, scalable internal and/or external storage and forwards the raw log data to a selected log data analyzer (e.g., 111) which may be associated with a certain log-producing device. Examples of external scalable data storage include Storage Area Networks (SAN's) and Network Attached Storage (NAS).

Figure 2B:
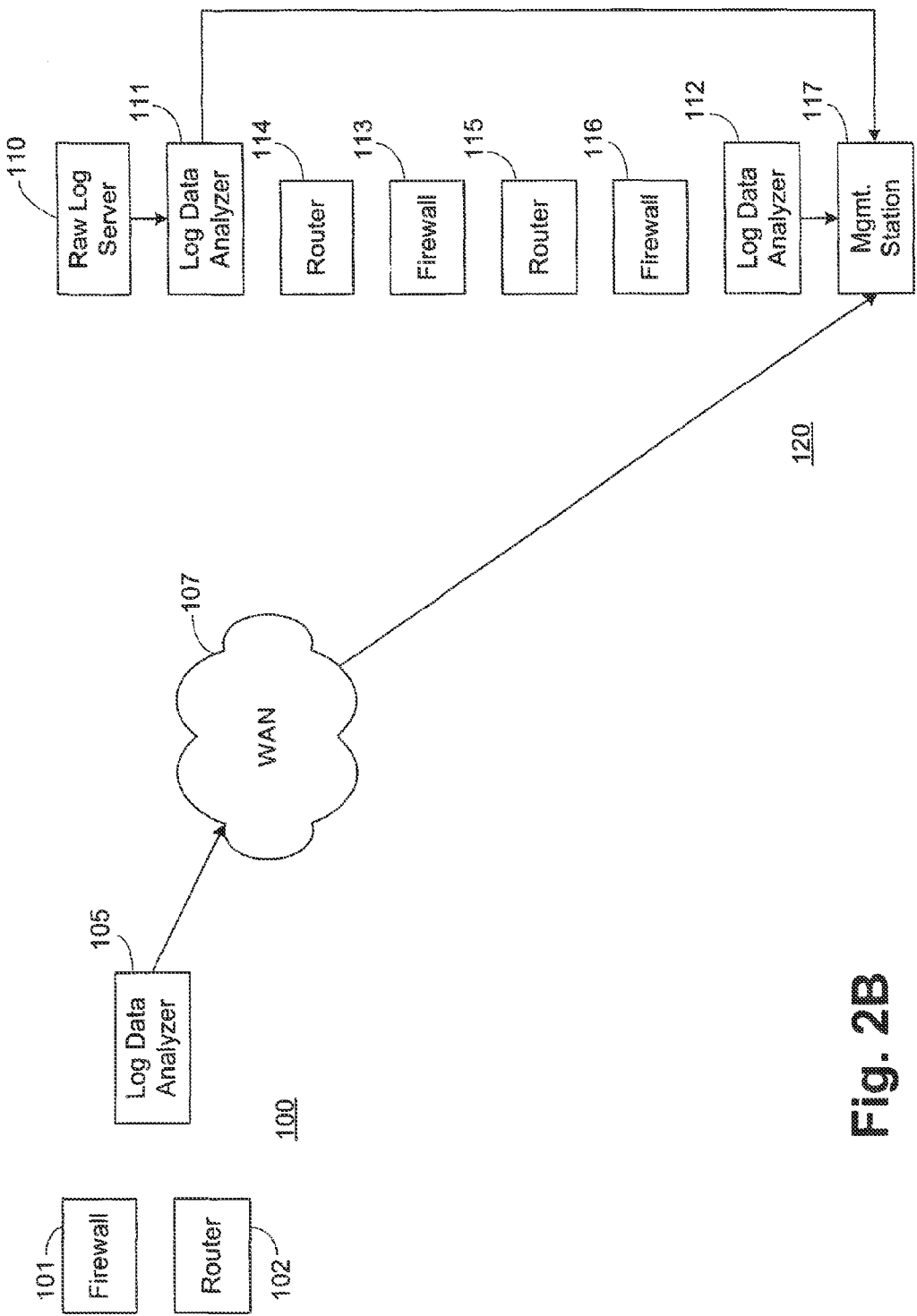
FIG. 2B is a schematic diagram depicting the flow of parsed and/or summarized log data in one representative embodiment of the invention.

The flow of parsed and/or summarized log data according to one illustrative embodiment is shown schematically in FIG. 2B. In response to a query from management station 117, database reports comprised of parsed and/or summarized log data may be sent from log data analyzer 105 at remote location 100 to the security management station 117 via WAN 107 while a report from a database maintained by log data analyzer 111 is sent to management station 117. As shown in FIG. 1, the data communications link between log data analyzer 111 and management station 117 may be a local area network.

Inasmuch as merging live and compressed data streams into a single open database table may be problematic, in certain embodiments of the invention, one process is used to receive the live, raw log data streams using a first protocol from the local log-producing devices and another process gathers the compressed, encrypted data streams from remote locations sent using a second protocol and a third process merges the two data streams into a single, sequentially ordered database table. This may be advantageously accomplished in a "batch mode" wherein the raw log data gathering is segmented into certain time intervals. When an interval closes, the data from both the local and remote log-data-producing devices may be forwarded to the merge process for insertion into the database in proper order. In this way, the data reception processes can proceed independently and not require real-time synchronization or the insertion, as opposed to appending, of live data into an open database table. In other embodiments, it may be desired to keep the local and remote data streams separate (at the expense of reporting ease) in order to provide greater data integrity.

FIGS. 3A, 3B, 3C and 3D are flowcharts depicting the steps in representative processes for collecting and storing raw log data according to the present invention. These processes may occur in parallel—i.e., substantially simultaneously—or they may be performed sequentially. The process depicted in FIG. 3A may take place at a location remote from those occurring in a local system, depicted in FIGS. 3B through 3F.

Figure 3A:
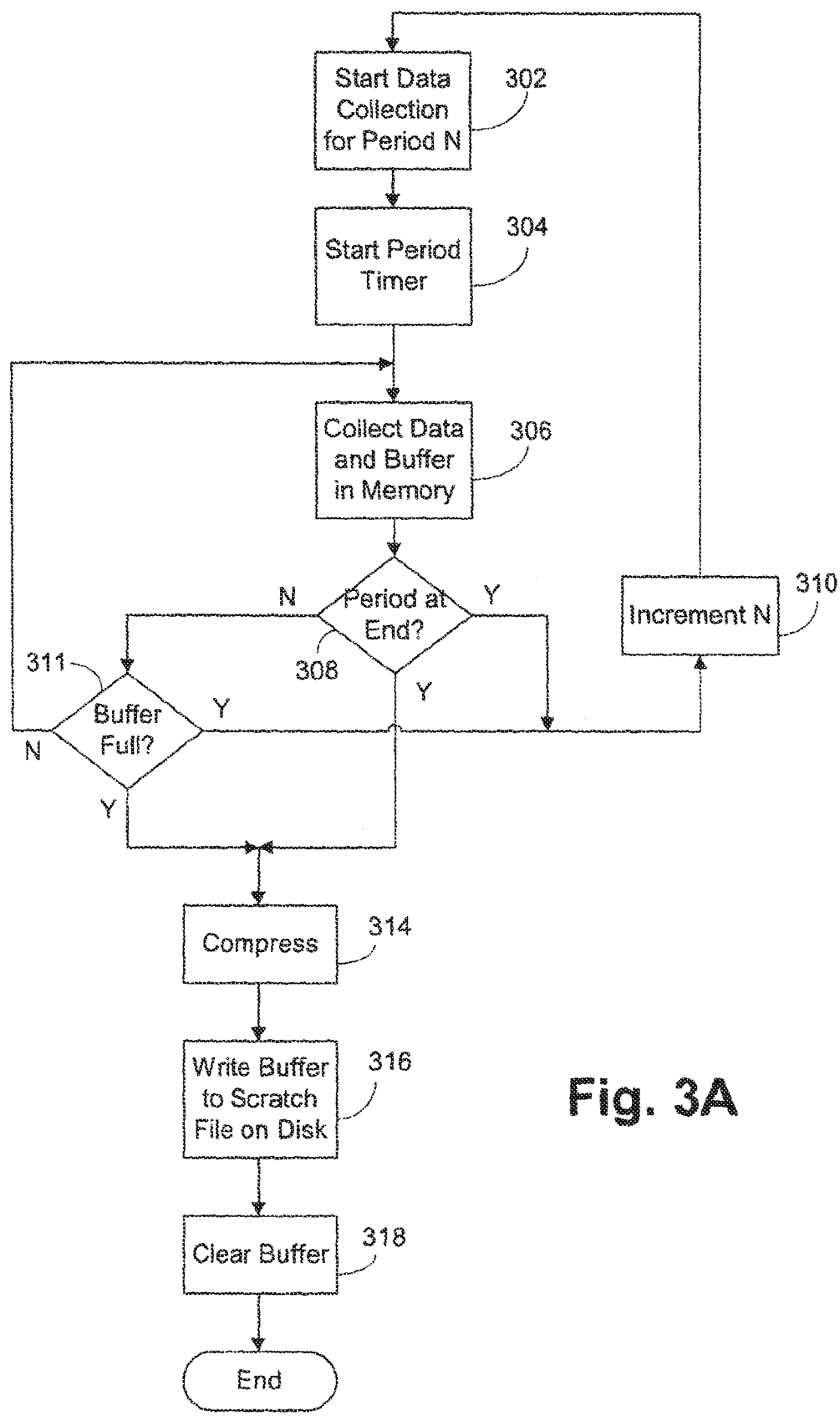
FIGS. 3A through 3F are flowcharts of a data processing method according to certain embodiments of the invention.

In the process of FIG. 3A, sets of raw log data from one or more log-producing devices are collected periodically in a certain time interval set by the period timer. The process begins at block 302 with the initiation of a new set of raw log data, denominated "Period N". The interval timer is started at block 304 and, at block 306, data is collected and stored in a buffer in a log data analyzer which is in direct data communication with the log-producing device(s). At decision diamond 308, the current value of the timer is read and compared to the selected interval. If the period has not yet expired, the process proceeds to decision diamond 311 where a determination is made of whether the buffer is full. If not, the process loops back to block 306 and the collection of raw log data continues. If, however, the period has expired or the buffer has become full, a new period, N+1, is created by incrementing the period counter (Block 310) and beginning a new set of raw log data (Block 302). Concurrently, the data set for period N may be compressed at block 314 and written to a scratch file on a disk at block 316. At block 318, the buffer holding the data set for period N may be cleared, thereby making it available for use with subsequent raw log data sets.

Figure 3B:
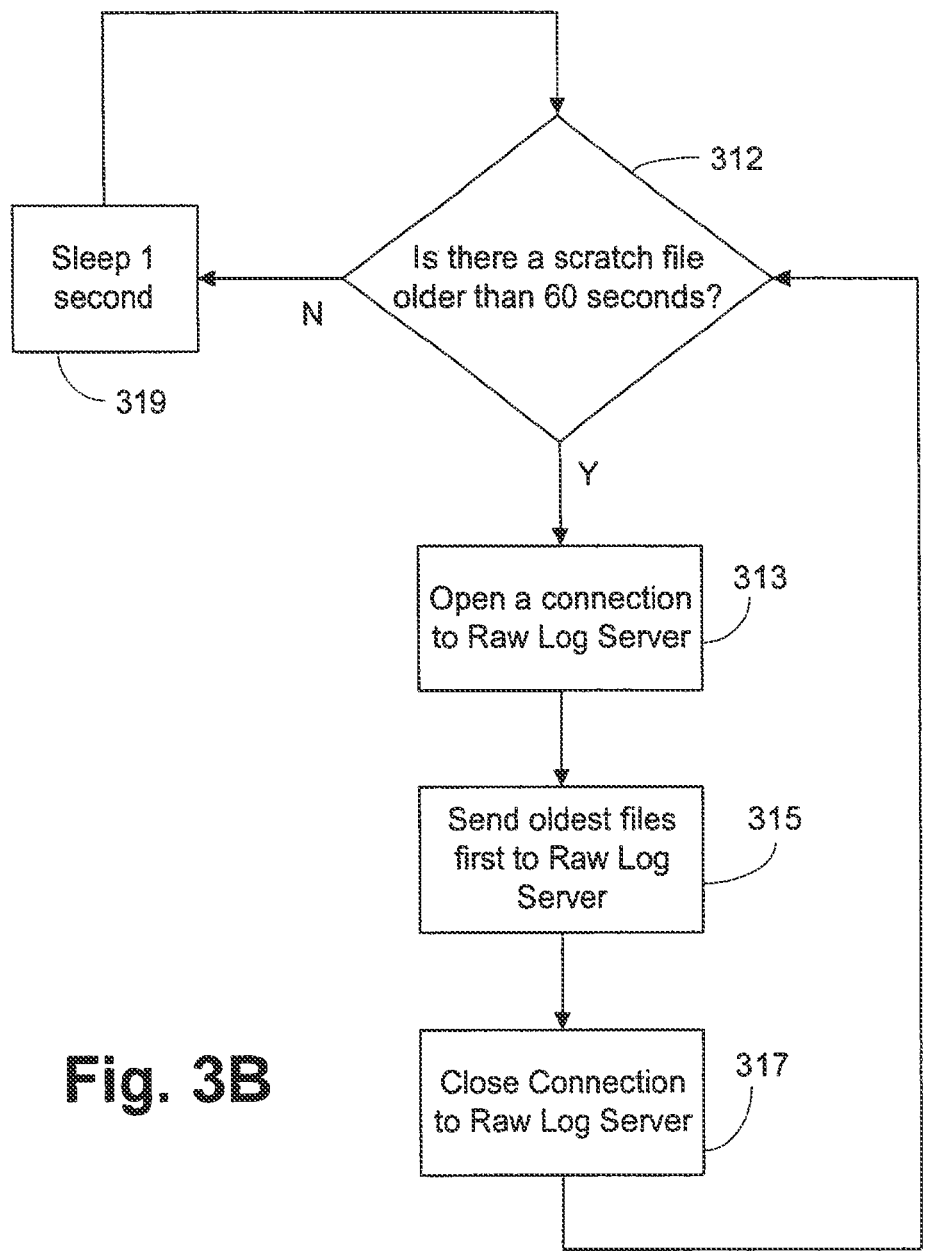

The raw log server may be at a location remote from the equipment performing the process of FIG. 3A and the data set may be sent to the raw log server over a WAN which may be a public network such as the Internet. In FIG. 3B, a concurrent process is shown for sending data sets to the raw log server. At decision diamond 312, the process examines data sets stored by the data collection process of FIG. 3A at block 316 to determine whether any scratch files are older than 60 seconds. If not, the process waits for one second (block 319) and then retests the age of the files (diamond 312). If one or more files older than 60 seconds are discovered (YES branch of diamond 312), the process opens a connection to the raw log server at block 313 and, at block 315, sends the file (oldest file first) to the raw log server. In certain embodiments, the file may be further compressed and/or encrypted prior to being sent. In addition, the file may have a hash value, such as an MD5 hash, attached to further assist in integrity checking. At block 317, the connection to the raw log server is closed and the process resumes its search for data sets more than 60 seconds old (diamond 312).

Figure 3C:
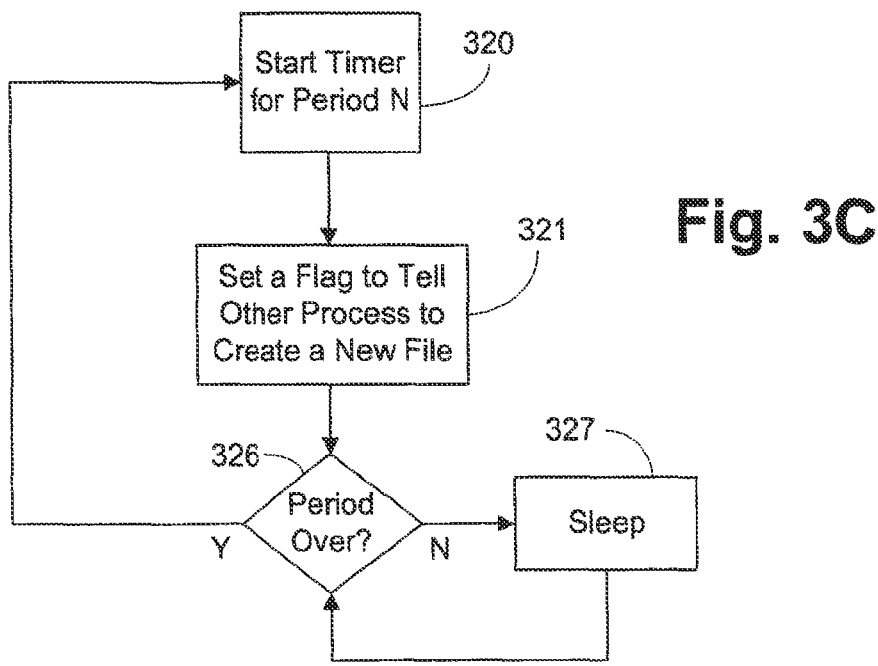
Figure 3D:
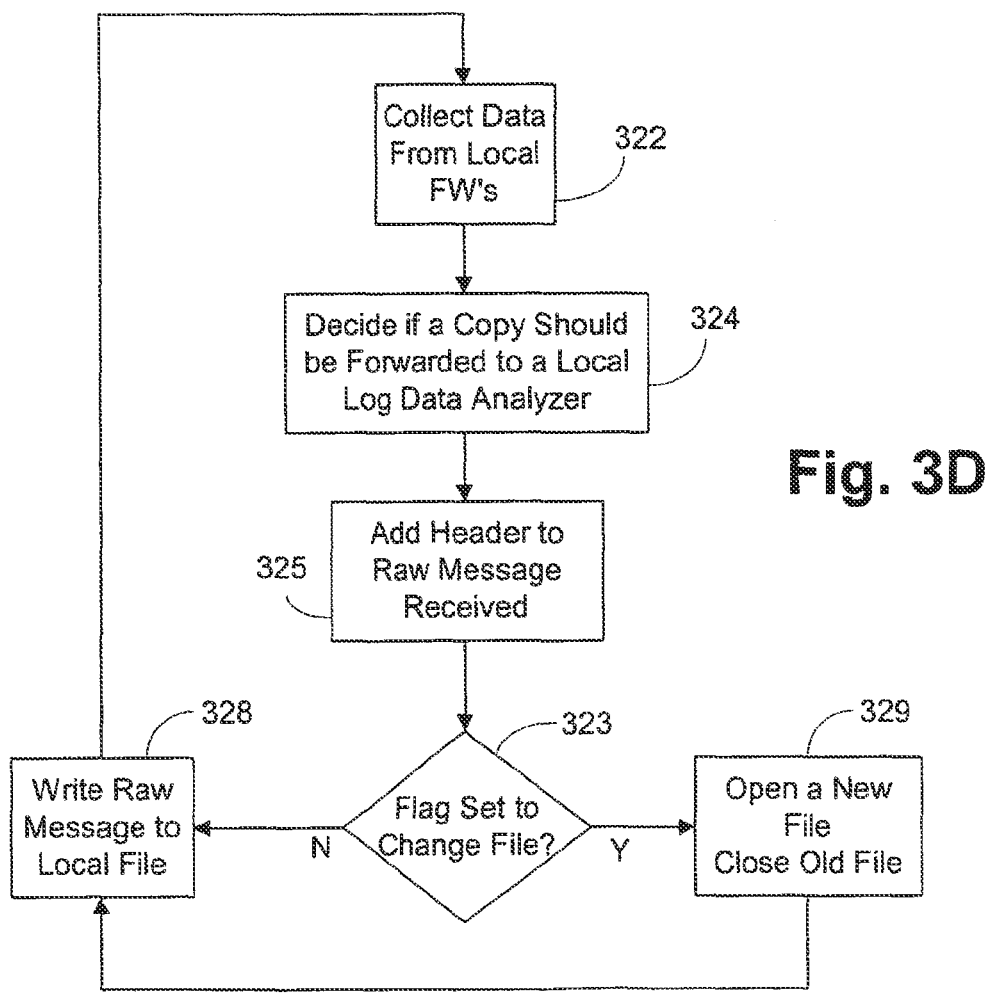

In FIGS. 3C and 3D, an analogous process is shown for a system wherein the log-producing devices are in direct data communication with the raw log server—e.g., the log-producing devices are connected by a LAN to the raw log server. In the particular embodiment illustrated, the raw log data is collected in files corresponding to certain time periods.

The process of FIG. 3C occurs substantially simultaneously with that illustrated in FIG. 3D. Time periods are defined in the process of FIG. 3C wherein the period N begins at block 320 with the starting of a timer. In one preferred embodiment, the data is collected into one-minute time intervals. It is convenient, but not necessary to select the same period length for the process of FIG. 3C as that for the remote device(s) as shown in FIG. 3A. At block 321, the process sets a flag to inform the process of FIG. 3D that a new file should be created. At diamond 326 and block 327 the process waits for the period to come to an end, at which point the process returns to block 320 and a new period begins.

Referring now to FIG. 3D, log data is collected from local log-producing devices such as firewalls at block 322. At block 324, the raw log data may also be forwarded to a particular log data analyzer(s) associated with the particular log-producing device whose data is being stored. This is done by a process that consults a table which correlates log-producing devices with log data analyzers. The table may be simple or may include complex filtering rules and resultant actions. The process adds a header which may contain a time stamp and/or a device identifier to the raw message received at block 325. At diamond 323 the flag which may be set by the timing process (FIG. 3C) is tested and, if not set, the process proceeds to block 328 where the data in the data buffer (which in certain embodiments may be in the RAM of a processor-based system) is written to a local file for period N. If the flag is found to be set (at diamond 323), a new file is opened, the old file is closed (block 329) and the writing of data to a new local file occurs at block 328.

Figure 3E:
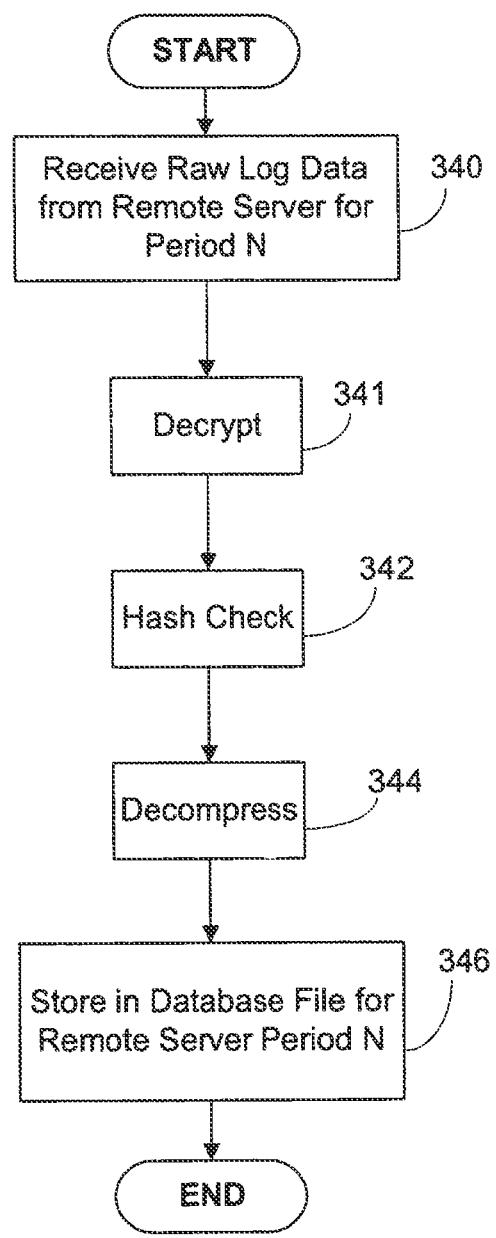

Data sets collected by the process depicted in FIG. 3A at the remote location may be received and processed by the raw log server according to the process shown in FIG. 3E. At block 340, a set of raw log data for time period N is received at the raw log server following transmission over a data communications network(s). If the raw log data has been encrypted for transmission, the data may be restored to its original format by decrypting it at block 341. If the data has been hashed, the data is hashed again and the hash values compared to test integrity in block 342. If the raw log data has been compressed, it may be decompressed at block 344. The order of blocks 341, 342 and 344 may be altered in certain embodiments. In general, the hash check should be performed on the raw log data in the state in which the first hash was performed. Alternatively, the hash check, data decompression and/or decryption may be performed elsewhere in the system prior to receipt by the raw log server. At block 346, the restored raw log data from the remote device may be stored in a temporary database file for the particular time period and particular device.

Figure 3F:
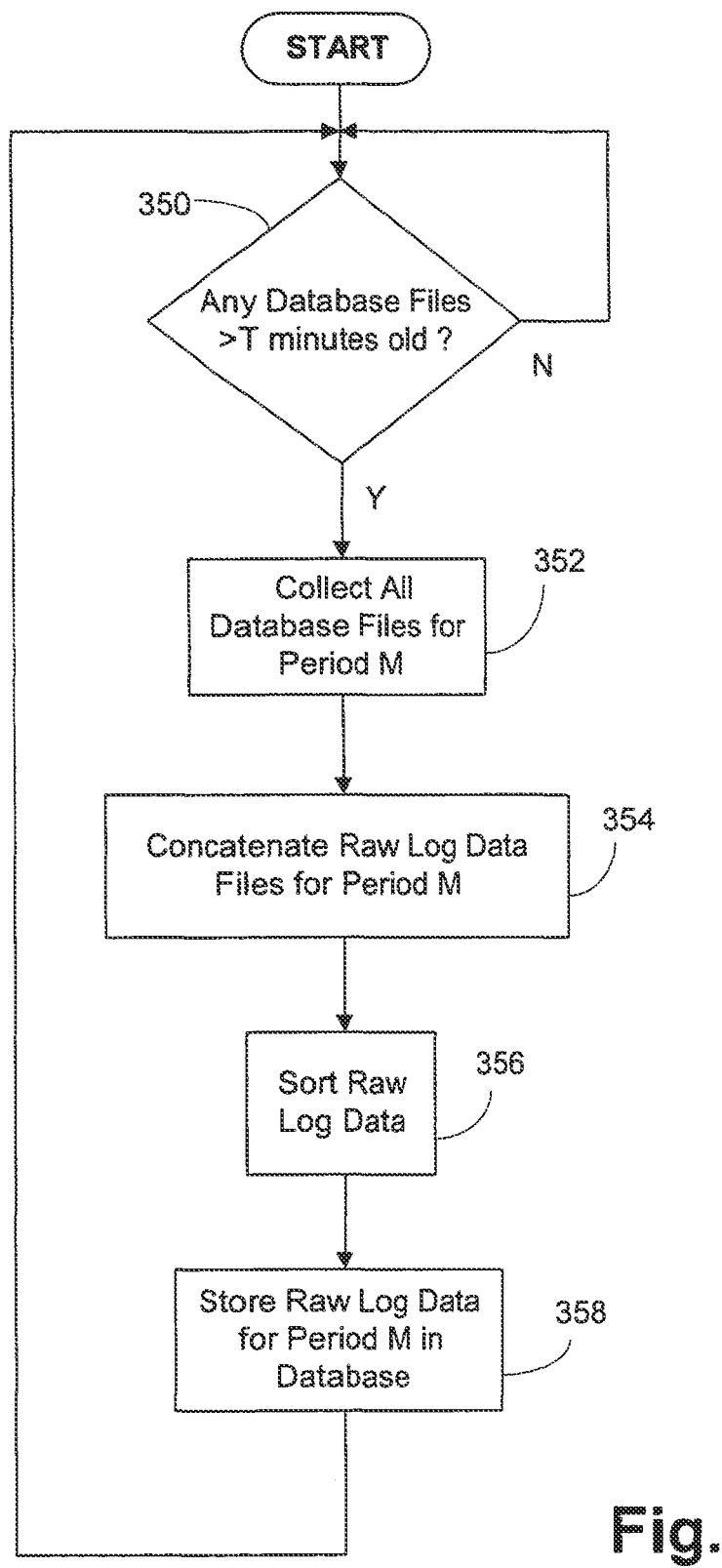

FIG. 3F illustrates the steps in a process that collects the data sets for a certain period M and stores the collected data set in a database which may be maintained by the raw log server. In the process shown, concatenation is delayed for a period of T minutes to allow for some delay in the receipt of data sets from the remote location. In one particularly preferred embodiment, a three-minute period is selected (T=3 min.).

At block 350, the process continuously scans the temporary database files produced by the processes depicted in FIGS. 3B and 3C to determine whether any of those files are more than T minutes old—i.e., whether the terminus of period M is more than T minutes prior to the current time. If such files are found, they are collected for the period M at block 352 and concatenated at block 354. The raw log data set so produced may then be sorted at block 356. The sort may be chronological—i.e., the raw log data for the local and remote log-producing devices may be placed into chronological order prior to storage in the raw log server's database for the period M (as shown at block 358). It has been found that system resources may be conserved and system performance improved if the raw log data sets are sorted prior to insertion into the database. It should also be understood that this process may also occur multiple times for period M if, for example, log data for period M from remote log data analyzers arrived at the raw log server at differing times where at least one set is more than T minutes old.

It will be appreciated that the order of blocks 316, 328 and 340 shown in the processes of FIGS. 3A, 3B and 3C is not predefined. The timing of the receipt of data sets from the remote process of FIG. 3A is not determinate—data transmission over the WAN may be delayed, perhaps for a significant length of time. However, the process of the present invention accommodates such timing uncertainties by performing batch-wise insertions of log data into the raw log data database. In this way, the database need be opened only for the insertion of sets of concatenated and sorted raw log data and the problems associated with adding randomly-received data to a database are avoided.

As noted above, the quantity of raw log data generated by log-producing devices on a network may be significant. Accordingly, the raw log server may be equipped with attached storage and/or a connection to Network Attached Storage, a storage area network (SAN) (which, in one preferred embodiment, is a Fibre Channel network), WORM (Write Once, Read Many) storage and other real-time data storage means. The use of external storage allows simple growth or expansion of the stored log data over time. The raw log server may also be equipped with means for archival data storage such as magnetic tape or optical media. The database management process may include provisions for periodically moving raw log data from storage in the database to archival storage. Alternatively, data may simply be deleted from the database at certain intervals, upon aging to a predetermined value, upon some other predefined event or upon command from the data management station.

As noted previously, parsed and/or summarized log data may be stored by the system in databases or files maintained by log data analyzers (105, 111, 112). A firewall may produce upwards of 10 million various messages (i.e., log data) per day. This quantity of raw log data is frequently too much for a network administrator to analyze effectively. Accordingly, methods have been developed to parse and summarize log data.

The exemplary parser parses the received raw log data to extract fields based upon log data message type, and generates Structured Query Language (SQL) statements from the extracted fields. Subsequently, a database inserter inserts the SQL statements into database tables in memory, according to the message type, such as accept, deny or other. A summarizer summarizes the SQL statements stored in the database tables over various intervals of time, and copies the summarized SQL statements to tables stored on disk. The summarizer determines which sets of SQL statements have identical source IP, destination IP, and destination port numbers, irrespective of the source port numbers of the SQL statements. The summarizer then creates a new statement (i.e., message) generated from the 50 messages, for example. The summarizer may repeat the above summarization process over the SQL statements stored in the tables for other fields of commonality to create other new condensed statements. Thus, in one embodiment of the invention, the summarizer creates a fine-grained accept data chunk comprising a condensation of the SQL statements stored in the tables, based upon predefined fields of commonality (e.g., source IP, destination IP, and destination port numbers) and one or more fields of uniqueness (e.g., source port number).

Exemplary summarized tables may include fine-grained deny tables, 1-hour accept tables, 24-hour accept tables, and 24-hour deny tables. In alternative embodiments of the invention, the tables may be configured to store data over other periods of time (e.g., 10-minute accept tables to 30-day accept and deny tables). In one embodiment of the invention, the fine-grained deny table stores data for thirty days.

As shown in FIG. 1, the system may include a security management station 117 that may, in certain embodiments, be implemented in software on a personal computer or workstation in data communication with the private network. Alternatively, the management station may be implemented in dedicated hardware.

The management station may be used to retrieve data from the databases maintained by the raw log server(s) 110 and/or the log data analyzer(s) 105, 111, 112. The management station 117 may include one or more processes for distributing database queries to the appropriate log data analyzers and aggregating the responses received from individual log data analyzers (database reports) into a single report. By way of example, if the system administrator wished to view a report covering all system traffic during a certain time interval, the management station might query all of the networked log data analyzers for summarized data in that interval and then aggregate that data into a single report. However, if the system administrator wished to view a summarized log data report for a certain network port, the management station might query only the log data analyzer associated with the particular firewall assigned to that port.

Figure 4:
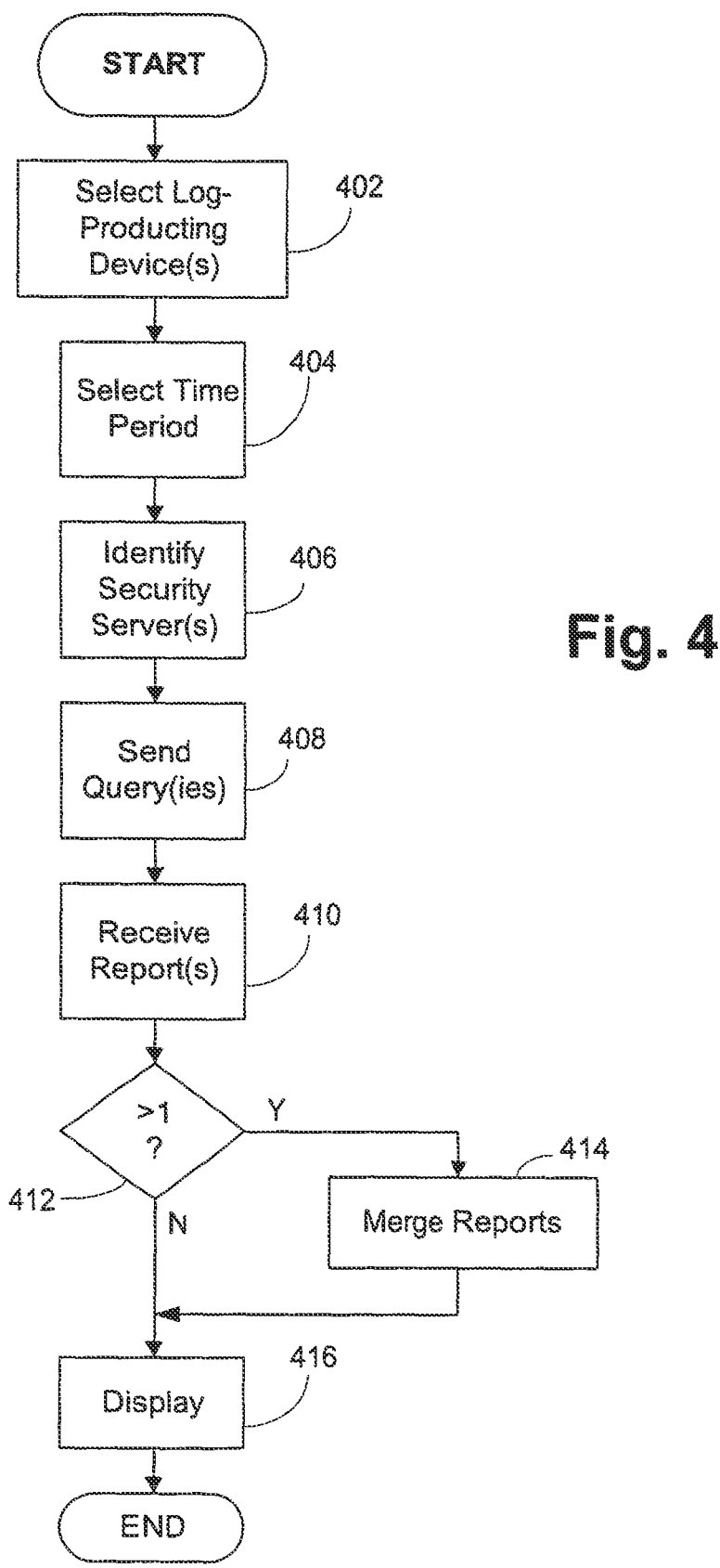
FIG. 4 is a flowchart of a data processing method according to one embodiment of the invention for obtaining a report from a central management station.

One illustrative process for obtaining a report from a central management station is shown in flowchart form in FIG. 4. The process begins at block 402 with a user selecting a report from one or more log data analyzers. In one embodiment of the invention, the selection may be made of one particular log-producing device or all of the log-producing devices on the system. In other embodiments, the user may select multiple (but less than all) log-producing devices, as desired. An example of a situation wherein a system administrator might desire a report from a single log-producing device is when a security attack on a the system was made through a particular port—e.g., a Telnet port—in which case parsed and/or summarized log data from the log-producing device associated with the system's Telnet port(s) would be sought.

Similarly, as shown at block 404, the user may select the time period to be covered by the report. The order of blocks 402 and 404 may be reversed in some embodiments or all of the selections may be made at one time on one query screen.

At block 406, the process identifies the particular log data analyzer(s) whose databases need to be queried in order to compile the report requested by the user. In one preferred embodiment, this determination is accomplished by a table look up on the raw log server, but this information may be stored elsewhere, including the management station itself. At block 408, a database query (or queries in the case of multiple log data analyzers) is formulated and sent to the log data analyzer(s) hosting the database(s) of interest identified in block 406. Each queried log data analyzer on the system will then respond by sending a database report of parsed and/or summarized log data corresponding to the time period selected. The reports are received by the management station at block 410.

As shown at decision diamond 412, a determination may be made of whether a plurality of reports has been received. If so, the management station may then merge the various reports received (at block 414) into a single report and print, display and/or store the merged report at the management station (block 416).

A log data analyzer (105, 111 and/or 112) may, in certain embodiments, store summarized log data in a database and respond to queries from a centralized management station. One such process may include: receiving raw log data in a log data analyzer; parsing the raw log data; summarizing the parsed log data; storing the summarized data in a database maintained by the log data analyzer; receiving a database query from a management station; generating a database report in the log data analyzer from the summarized data in response to the query received from the management station; and, sending the database report to the management station. The database report may include the time period of the summarized data and the data in the report may be sorted by the time period of the summarized data. At the option of the user, the data in the report may be limited by the time period of the summarized data.

While the exemplary log-producing devices in this description have been firewalls and routers, and the log data has related to networking operations, it is to be understood that other of the many log-producing devices, such as mail servers and the like, and other log data, such as operation status, errors and other events, could be used according to the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method for processing log data, the method comprising:
   receiving raw log data in a log data analyzer from a plurality of log-producing devices, the raw log data including a plurality of messages;
   parsing the raw log data to generate structured query language (SQL) statements representing the raw log data, including:
      extracting fields from the raw log data based on a log data message type for each message, the log data message type indicating that a respective message is associated with a pre-defined type of event on a log-producing device that produced the respective message;
      generating the SQL statements from the extracted fields, wherein the extracted fields are incorporated into the SQL statements; and
      inserting the SQL statements into a database table designated to store the generated SQL statements on a volatile storage device, the database table being different from database tables for storing the raw log data;
   summarizing the SQL statements, including:
      at pre-specified time intervals, copying the SQL statements stored in the database table stored on the volatile storage device to one or more database tables stored on a non-volatile storage device;
      identifying, from the SQL statements stored in the one or more database tables on the non-volatile storage device, a set of one or more SQL statements each including one or more fields of commonality and one or more fields of uniqueness, each field of commonality being a field storing a value that is commonly incorporated in the set of SQL statements, each field of uniqueness being a field storing values that are different among the set of SQL statements; and
      creating summarized data, the summarized data including a new statement condensed from the identified set of one or more SQL statements based on the one or more fields of commonality and one or more fields of uniqueness; and
   generating a report based on the summarized data, wherein the method is performed by one or more computers.

2. The method of claim 1, where the one or more fields of commonality include at least one of an identical source Internet protocol (IP) address, an identical destination IP address, or an identical destination port number.

3. The method of claim 1, where the one or more fields of uniqueness includes a source port number.

4. The method as recited in claim 1, where inserting the SQL statements into the database table includes inserting the SQL statements into an accept table or a deny table.

5. The method of claim 4, where each of the accept table and deny table is configured to store data over a time period.

6. The method of claim 1, where the data in the report are limited by a time period of the summarized data.

7. The method of claim 1, wherein generating the report based on the summarized data comprises:
   receiving a database query from a management station;
   generating a database report in the log data analyzer using the summarized data in response to the database query; and
   sending the database report to the management station.

8. A data processing system for processing log data comprising:
   a management station including one or more processors; and
   a log data analyzer including one or more processors, the log data analyzer being connected to the management station via a data communications link and configured to perform operations comprising:
      receiving raw log data from a plurality of log-producing devices, the raw log data including a plurality of messages;
      parsing the raw log data to generate structured query language (SQL) statements representing the raw log data, including:
         extracting fields from the raw log data based on a log data message type for each message, the log data message type indicating that a respective message is associated with a pre-defined type of event on a log-producing device that produced the respective message;
         generating the SQL statements from the extracted fields, wherein the extracted fields are incorporated into the SQL statements; and
         inserting the SQL statements into a database table designated to store the generated SQL statements, the database table being different from database tables for storing the raw log data;

summarizing the SQL statements, including:
identifying, from the SQL statements inserted into the database table, a set of one or more SQL statements based on one or more fields of commonality and one or more fields of uniqueness, each field of commonality being a field storing a value that is commonly incorporated in the set of SQL statements, each field of uniqueness being a field storing values that are different among the set of SQL statements; and creating summarized data, the summarized data including a new statement condensed from the set of one or more SQL statement based on the one or more fields of commonality and one or more fields of uniqueness; and generating a report based on the summarized data.

9. The system of claim 8, where the one or more fields of commonality include at least one of an identical source Internet protocol (IP) address, an identical destination IF address, or an identical destination port number.

10. The system of claim 8, where the one or more fields of uniqueness includes a source port number.

11. The system of claim 8, where inserting the SQL statements into the storing includes inserting the SQL statements into an accept table or a deny table.

12. The system of claim 11, where each of the accept table and deny table is configured to store data over a time period.

13. The system of claim 8 wherein the log data analyzer limits the data in the report by a time period of the summarized data.

14. The system of claim 8, wherein generating the report based on the summarized data comprises:
receiving a database query from the management station;
generating a database report in the log data analyzer using the summarized data in response to the database query; and
sending the database report to the management station.

15. A non-transitory storage device storing computer software, the computer software operable to cause one or more computers to perform operations comprising:
receiving raw log data in a log data analyzer from a plurality of log-producing devices, the raw log data including a plurality of messages;

parsing the raw log data to generate structured query language (SQL) statements representing the raw log data, including:
extracting fields from the raw log data based on a log data message type for each message, the log data message type indicating that a respective message is associated with a pre-defined type of event on a log-producing device that produced the respective message;
generating the SQL statements from the extracted fields, wherein the extracted fields are incorporated into the SQL statements; and
inserting the SQL statements into a database table designated to store the generated SQL statements the database table being different from database tables for storing the raw log data;

summarizing the SQL statements, including:
identifying, from the SQL statements inserted into the database table, a set of one or more SQL statements based on one or more fields of commonality and one or more fields of uniqueness, each field of commonality being a field storing a value that is commonly incorporated in the set of SQL statements, each field of uniqueness being a field storing values that are different among the set of SQL statements; and creating summarized data, the summarized data including a new statement condensed from the identified set of one or more SQL statements based on the one or more fields of commonality and one or more fields of uniqueness; and generating a report based on the summarized data.

16. The non-transitory storage device of claim 15, where the one or more fields of commonality include at least one of an identical source Internet protocol (IP) address, an identical destination IP address, or an identical destination port number.

17. The non-transitory storage device of claim 15, where the one or more fields of uniqueness includes a source port number.

18. The non-transitory storage device as recited in claim 15, where inserting the SQL statements into the database table includes inserting the SQL statements into an accept table or a deny table.

19. The non-transitory storage device of claim 18, where each of the accept table and deny table is configured to store data over a time period.

* * * * *